(No Model.)

C. L. COFFIN.
PROCESS OF ELECTRIC WELDING.

No. 401,639. Patented Apr. 16, 1889.

Witnesses.
Adelaide A. Anderson
Geo. H. Lothrop

Inventor.
Charles L. Coffin.

UNITED STATES PATENT OFFICE.

CHARLES L. COFFIN, OF DETROIT, MICHIGAN.

PROCESS OF ELECTRIC WELDING.

SPECIFICATION forming part of Letters Patent No. 401,639, dated April 16, 1889.

Application filed September 18, 1888. Serial No. 285,741. (No model.)

*To all whom it may concern:*

Be it known that I, CHARLES L. COFFIN, of Detroit, in the county of Wayne and State of Michigan, have invented a new and useful Improvement in Process of Electric Welding, of which the following is a specification.

My invention consists in an improved process of electric welding, hereinafter fully described and claimed.

Figure 1:
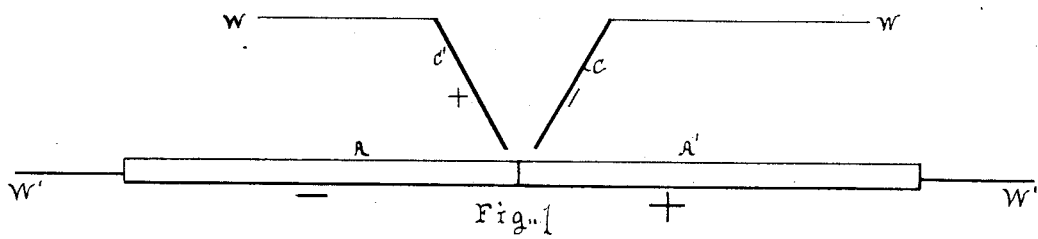
Figure 2:
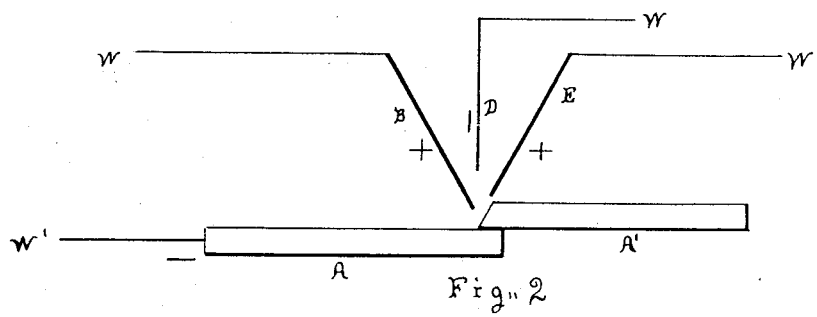

Figure 1 illustrates my process as applied to the process of electric welding described in my application for patent allowed July 18, 1888, Serial No. 272,513, and Fig. 2 illustrates my process as applied to the process of electric welding set forth in Patent No. 363,320, issued May 17, 1887, to Benardos and Olszewski.

In Fig. 1, A A′ represent the articles to be welded, and C C′ represent carbons or conductors, which are intended to be carried in a suitable holder, and which are respectively connected with the poles of an electric generator, as by the wires W, whereby a voltaic arc is sprung between and downward from said carbons, to fuse and weld together the meeting parts of the articles A and A′. In addition to this I connect the article A and the article A′ with the poles of the generator with which the carbons are connected, or with the poles of an independent generator, in such manner that the polarity of each article and of the carbon above said article will be opposite, the article A being negative and the carbon C′ being positive, and the article A′ being positive and the carbon C being negative, whereby, in addition to the arc between the carbons, a voltaic arc is also formed between the carbon C′ and article A, and another voltaic arc is formed between the carbon C and the article A′, thus largely increasing the surface of operation and efficiency of the voltaic arc to which the parts to be welded are subjected.

The process illustrated in diagram Fig. 2 is intended to apply to that system of electric welding described in Patent No. 363,320, in which both articles A and A′ are connected, as by wire W′, with one pole (in the diagram with the negative pole) of a generator of electricity, and the arc is sprung between said articles and the carbon B, connected with the other or positive pole of said generator. In this I add two carbons, D and E, connected with opposite poles of the same generator of electricity with which A and B are connected, or with an independent generator, the carbon D being of opposite polarity to carbon B, and carbon E being of like polarity with carbon B, whereby, in addition to the arc between A and B, there are also formed voltaic arcs between B and D, D and E, E and A′, whereby the extent of the arc obtained from a given generator is very largely increased and the operation of welding heavy material very materially facilitated.

What I claim as my invention, and desire to secure by Letters Patent, is—

The herein-described process of electric welding, consisting in submitting the joint to be welded simultaneously to the action of manifold arcs instead of a single arc, substantially as and for the purposes set forth.

CHARLES L. COFFIN.

Witnesses:
HENRY B. LOTHROP,
ADELAIDE A. ANDERSON.